United States Patent [19]

Rose et al.

[11] Patent Number: 5,634,657
[45] Date of Patent: Jun. 3, 1997

[54] ELLIPTICAL PLENUM FOR GAS FLOW CONTROL IN AN AUTOMOTIVE AIRBAG SYSTEM

[75] Inventors: Larry D. Rose, Layton; David J. Green, Brigham, both of Utah

[73] Assignee: Morton International, Inc., Chicago, Ill.

[21] Appl. No.: 565,702

[22] Filed: Nov. 30, 1995

[51] Int. Cl.⁶ .................................................. B60R 21/26
[52] U.S. Cl. ...................... 280/728.2; 280/732; 280/740
[58] Field of Search ........................... 280/728.2, 732, 280/736, 740, 741, 742, 728.1, 730.1, 731

[56] References Cited

U.S. PATENT DOCUMENTS

| | | | |
|---|---|---|---|
| 3,539,200 | 11/1970 | Chute | 280/731 |
| 3,791,671 | 2/1974 | Zens | 280/740 |
| 3,817,552 | 6/1974 | Knight, IV et al. | 280/732 |
| 4,941,678 | 7/1990 | Lauritzen et al. | 280/732 |
| 4,964,654 | 10/1990 | Bishop et al. | 280/728.2 |
| 5,022,674 | 6/1991 | Frantom et al. | 280/741 |
| 5,308,108 | 5/1994 | Rion | 280/728.2 |
| 5,332,256 | 7/1994 | Lauritzen et al. | 280/728 A |
| 5,340,147 | 8/1994 | Fontecchio et al. | 280/740 |
| 5,360,232 | 11/1994 | Lowe et al. | 280/741 |
| 5,378,015 | 1/1995 | Rink et al. | 280/736 |
| 5,387,009 | 2/1995 | Lauritzen et al. | 280/741 |
| 5,405,164 | 4/1995 | Paxton et al. | 280/728 A |
| 5,421,609 | 6/1995 | Moore et al. | 280/737 |
| 5,425,550 | 6/1995 | Paxton et al. | 280/732 |
| 5,431,436 | 7/1995 | Mossi et al. | 280/732 |
| 5,435,595 | 7/1995 | Lauritzen et al. | 280/736 |
| 5,441,705 | 8/1995 | Lauritzen et al. | 280/728.1 |
| 5,454,586 | 10/1995 | Rogerson | 280/728.2 |
| 5,458,364 | 10/1995 | Mueller et al. | 280/728.2 |
| 5,470,104 | 11/1995 | Smith et al. | 280/737 |
| 5,470,105 | 11/1995 | Rose et al. | 280/740 |
| 5,480,182 | 1/1996 | Lauritzen et al. | 280/736 |

OTHER PUBLICATIONS

Commonly assigned, related, pending U.S.S.N. 08/228,332 (MI2256–21–24), filed Apr. 15, 1994.
Commonly assigned, realted, pending U.S.S.N. 08/280,894 (MI2256–21–49), filed Jul. 27, 1994.

*Primary Examiner*—Brian L. Johnson
*Assistant Examiner*—Peter C. English
*Attorney, Agent, or Firm*—Henry W. Tarring II; Gerald K. White

[57] ABSTRACT

A plenum having a generally elliptical cross-section is provided around an end discharge cylindrical inflator to redistribute the inflation gases before they enter the airbag cushion, thereby avoiding a skewed initial deployment thereof.

26 Claims, 5 Drawing Sheets

FIG. 2
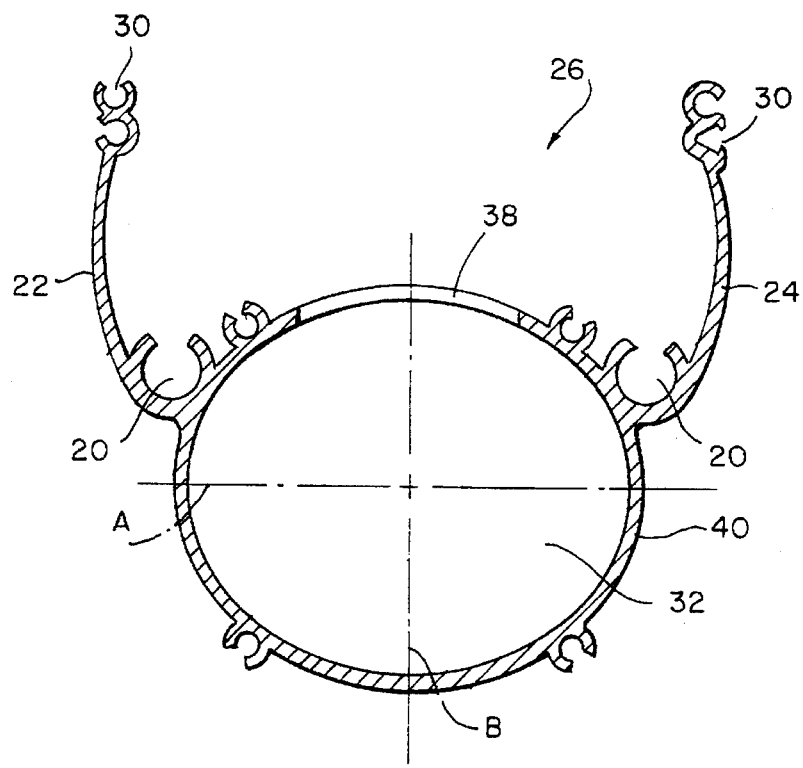
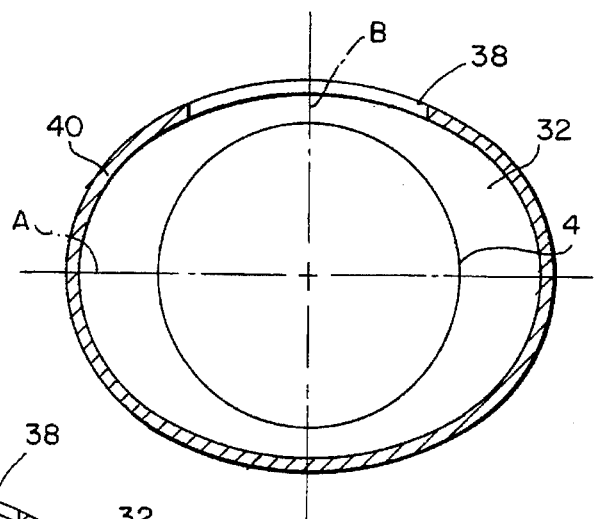
FIG. 3
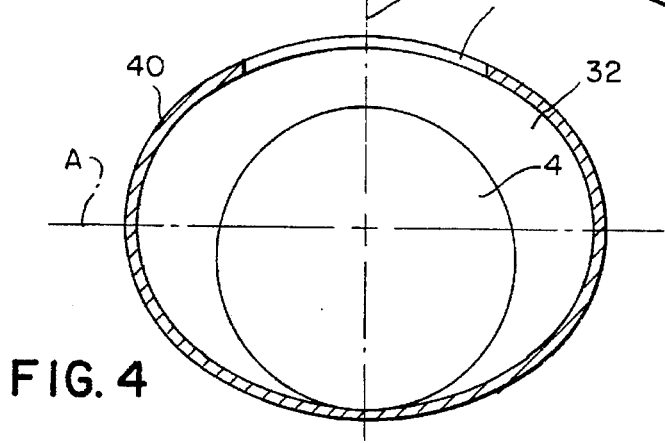
FIG. 4

ELLIPTICAL PLENUM FOR GAS FLOW CONTROL IN AN AUTOMOTIVE AIRBAG SYSTEM

BACKGROUND OF THE INVENTION

This invention relates to an inflatable restraint system, commonly referred to as an airbag system, which, when used in an automobile, will restrain the movement of a seated occupant in the event the vehicle is involved in a collision. More particularly, the invention is directed to an improvement in the structure for housing the inflator and cushion of such a system.

Airbag systems typically involve an inflator, which upon actuation by a collision sensor located somewhere on the vehicle body, rapidly produces a sufficient quantity of gas to inflate an associated cushion which rapidly expands to occupy the space between an occupant of the vehicle and one or more of the interior surfaces of the vehicle. The primary airbag system provided to protect automobile passengers (as contrasted with those to protect the driver) is typically located behind the instrument panel, or dashboard. Often such a passenger airbag system is intended to protect two passengers and is located further from the passengers than is the typical driver side airbag. Such a passenger side airbag system, therefore, has a larger cushion and requires a greater quantity of gas for its inflation. The limited space available, combined with the requirement for a relatively large gas output, dictates that inflators used with such systems typically are in the form of elongated cylinders mounted transverse to the direction of cushion deployment. Such inflators are typically provided in a trough like compartment provided at the rear of a housing. The folded airbag cushion is mounted between the inflator and an opening at the front of the housing. Examples of such housings are disclosed in commonly assigned U.S. Pat. Nos. 4,941,678 to Donald R. Lauritzen, Michael J. Ward and Scott R. Anderson; 5,332,256 to Donald R. Lauritzen and Bradley W. Smith; 5,387,009 to Donald R. Lauritzen and Larry D. Rose; 5,405,164 to Donald J. Paxton and David J. Green; 5,431,436 to G. Dean Mossi and Brett R. Garner; 5,435,595 to Donald R. Lauritzen, Donald J. Paxton and Larry D. Rose and 5,441,705 to Donald R. Lauritzen, David J. Green and Larry D. Rose. One type of recognized inflator design discharges the product gas at one end of its cylindrical structure. Typically such design is associated with so called hybrid inflators which function by igniting a solid pyrotechnic material which then heats a compressed inert gas producing an enhanced volume of gas product. Examples of such inflators are disclosed in commonly assigned U.S. Pat. Nos. 5,360,232 to William G. Lowe, Walter A. Moore and Linda M. Rink; 5,378,015 to Linda M. Rink, William G. Lowe and Daniel R. Leininger; 5,421,609 to Walter A. Moore, Leland B. Kort and Kelly B. Johnson; 5,425,550 to Donald J. Paxton, Bryan D. Matzl and David J. Green and in previously mentioned U. S. Pat. No. 5,405,164. The recently developed fluid fuel inflators also use an inflator design wherein the product gas is discharged at one end of its cylindrical structure. Such inflators are described in commonly assigned U.S. patent application Ser. No. 08/252,036, entitled FLUID FUELED AIRBAG INFLATOR, and filed on May 31, 1994 by Bradley W. Smith and Karl Rink now U.S. Pat. No. 5,470,104. The above mentioned commonly assigned patents are incorporated by reference herein. The use of the described inflator in the described housings requires that the gas be redirected and distributed into the interior of the cushion. Since the gas is discharged at only one end of the inflator, the cushion tends to fill preferentially at the same end and is undesirably skewed as it deploys. In the past, various methods, including the use of baffles, retainers, diffusers, tethers and plenums have been used to correct such skewed deployment of the cushion. Examples of such are found in U.S. Pat. No. 5,340,147 to Robert P. Fontecchio et al. and commonly owned U.S. Pat. application Ser. No. 08/280,894 filed by John C. Newkirk, Larry D. Rose, Donald R. Lauritzen, Michael J. Ravenberg, Mark A. Thompson, David J. Green and Terry R. Davis. These techniques have generally added extra cost and/or reduced the available cushion packaging space of the module.

It is an object of this invention to provide an economical plenum and reaction canister, or housing, for use with inflators which discharge their product gas at one end thereof. It is a further object to provide an airbag module using such a plenum and housing. More specifically, it is an object of this invention to provide a plenum which effectively controls the deployment skew associated with end discharge inflators without adding cost to the module, without adding significant gas flow restrictions or sacrificing cushion packaging space.

SUMMARY OF THE INVENTION

The invention provides an elliptical plenum design surrounding the inflator. The cylindrical inflator is installed in the plenum in a manner which provides ample space for the gases discharging from the inflator to be redirected to gas exit ports provided at locations in the plenum which encourage the proper deployment of the cushion. The design can be provided as an integral part of the module housing or it can be provided with the inflator as a separate assembly to be installed as a separate module in the airbag housing. In a preferred form parts of the plenum along with parts of the housing are provided as an extrusion.

BRIEF DESCRIPTION OF THE DRAWINGS

FIG. 2 is a cross-section of an extruded housing member used in the airbag module of FIG. 1.

FIG. 3 is a schematic end view showing the relative positions of an inflator in a plenum according to the present invention.

FIG. 4 is a schematic end view showing an alternative arrangement of an inflator in a plenum according to the present invention.

DETAILED DESCRIPTION OF THE INVENTION

Figure 1:
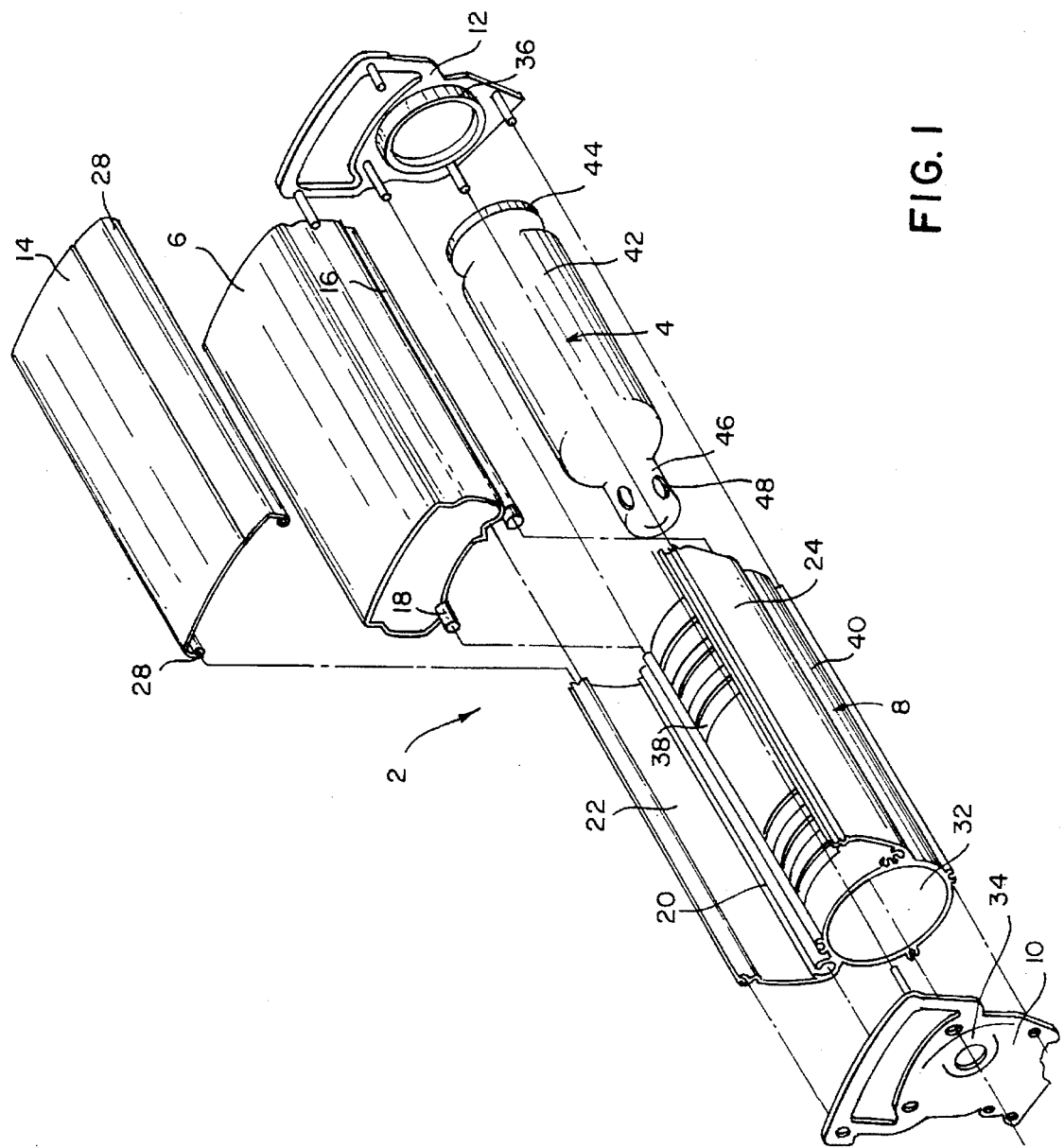
FIG. 1 is an exploded perspective view of an airbag module incorporating a plenum and a reaction canister according to the present invention.

An airbag system in accord with the present invention is illustrated in an exploded view in FIG. 1. The principal components of the airbag system 2 include inflator 4, uninflated, folded airbag cushion 6, extruded housing member 8, first and second opposing lateral ends of the housing 10 and 12, and cover 14. A cross-section of the extruded housing member 8 is illustrated in FIG. 2. The components are assembled by attaching the longitudinal edges 16 and 18 of the cushion 6 to receiving members 20 on the first and second longitudinal sides 22 and 24 of the cushion chamber 26. The longitudinal sides 28 of the cover 14 are likewise attached to receiving members 30 on the sides 22 and 24 of the cushion chamber 26. Depending on the mounting means provided for the inflator 4, it is inserted in the plenum 32 either before or after attaching the lateral ends 10 and 12 to the extruded housing member 8. In the embodiment shown in FIG. 1, after one of the lateral ends 10 or 12 is attached to the extruded housing member 8, the inflator 4 is inserted in plenum 32 and its leading end nested in the complementary mounting structure 34 or 36 provided on the assembled lateral end 10 or 12. The other lateral end is then attached to the extruded housing member 8 while assuring that the end of inflator 4 nests in the complementary mounting structure 34 or 36 of that lateral end.

The assembled airbag system provides a reaction canister for housing the inflatable airbag cushion and the inflator 4. The reaction canister comprises extruded housing member 8 and lateral ends 10 and 12. The assembled reaction canister forms a cushion chamber 26 for housing the airbag cushion 6. The cushion chamber is defined by the first and second upper longitudinal sides 22 and 24 of extruded housing 8, the upper portions of lateral ends 10 and 12, and the upper portion of plenum 32, which contains gas flow apertures 38. The upper side of the cushion chamber forms an elongated opening which permits the airbag cushion to be deployed therethrough.

Plenum 32, provided as a part of the reaction canister located beneath the chamber, comprises a side wall 40, formed as part of the extruded housing 8, having a cross-section of an essentially elliptical shape, and the lower portions of lateral ends 10 and 12, which form functionally closed, or sealed, end walls in conjunction with the mating portions of inflator 4 nested in the mounting structures 34 and 36. Gas flow apertures 38 in the upper portion of the plenum side wall 40 provide flow communication between plenum 32 and cushion chamber 26. As best seen in FIG. 2, the plenum is formed with an essentially elliptical cross-section having a major axis A and a minor axis B (as illustrated by the labeled center lines in FIG. 2). The exterior of the plenum side wall 40 engages the longitudinal side walls 22 and 24 of the cushion chamber 26 in proximity to the major axis of the plenum. The gas flow apertures 38 are located in the upper quadrant of the plenum side wall 40 which is traversed by the minor axis of the plenum. These gas flow apertures are provided at various points along the length of the elliptical plenum. The exact location of such apertures will vary depending on the relative inflator position, the cushion fold, the desired breakout characteristics, etc. regarding the particular airbag module involved. Generally, however, it is advantageous to provide the apertures adjacent the lateral ends 10 and 12, thereby encouraging gas flow adjacent and parallel to such ends; which, in most cases, fosters unskewed deployment of the airbag cushion in a direction normal to the elliptical plenum. Additional apertures, between those provided adjacent the lateral ends, can be desirable to avoid excessive pressure build up within the plenum, and/or to avoid introducing unacceptable delay in deploying the airbag.

The cylindrical inflator 4 has a generally circular side wall 42 which extends from a closed end 44 to the opposite end containing diffuser 46. The diffuser contains gas outlet ports 48 arranged in a thrust-neutral manner about its circumference. Such an inflator configuration is typically used with hybrid inflators, and can be used with other inflator types, such as the recently developed fluid fuel inflators. The cylindrical inflator 4 can be mounted in the center of the elliptical plenum, as illustrated in FIG. 3, or it can be located closer to the side of the plenum which is opposite the gas flow apertures 38, as is illustrated in FIG. 4. Additionally, as shown in FIG. 6, the inflator could contact the plenum along both sides of its minor axis. The inflator can be mounted by being nested within mounting structures 34 and 36 as shown in FIG. 1, or a larger access opening could be provided in lateral end 12 such that inflator 4 could be provided with a flange connection at its closed end 44, inserted through the access opening and the flange connection sealed to a mating flange provided on or adjacent the exterior side of lateral end 12. Alternatively, as illustrated in FIG. 5, the inflater 4 could be assembled with a tubular elliptical plenum 50 as a module, or sub-assembly, to be inserted in a reaction canister as a unit, either through its upper elongated opening or mouth, as illustrated in FIG. 7, or through sealable openings in its end walls similar to those shown in FIG. 1 and described above.

The folded airbag cushion 6 is mounted along the entire upper length of the plenum directly above the gas flow apertures 38 such that it presents an inlet opening to the inflation gas passing through apertures 38. Breakaway cover 14 is mounted across the elongated opening provided at the top of the cushion chamber 26 to provide a dust cover for the assembly until such time as the airbag is activated. At that time the inflating cushion breaks the dust cover open as it deploys through the elongated opening.

While the preferred method of constructing the elliptical plenum and reaction canister would involve aluminum or magnesium extrusion of the extruded housing as illustrated in FIGS. 1 and 2, other methods of construction can be employed, such as with castings of aluminum or magnesium, or those using a sheet metal, such as sheet aluminum or steel.

Figure 5:
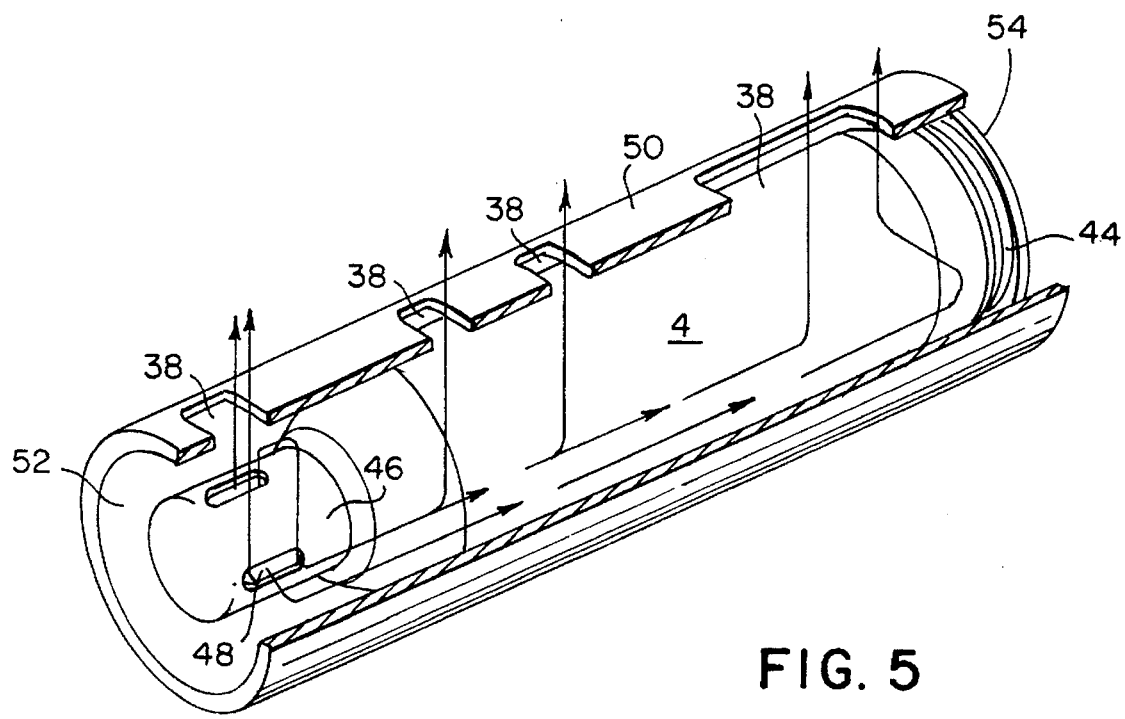
FIG. 5 is a fragmentary perspective view of a plenum and inflator sub-assembly according to the present invention.
Figure 6:
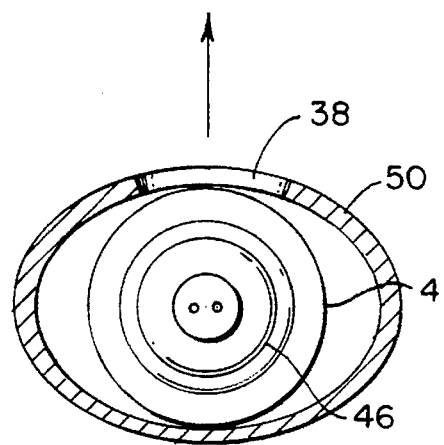
FIG. 6 is an end view of the sub-assembly illustrated in FIG. 5.
Figure 7:
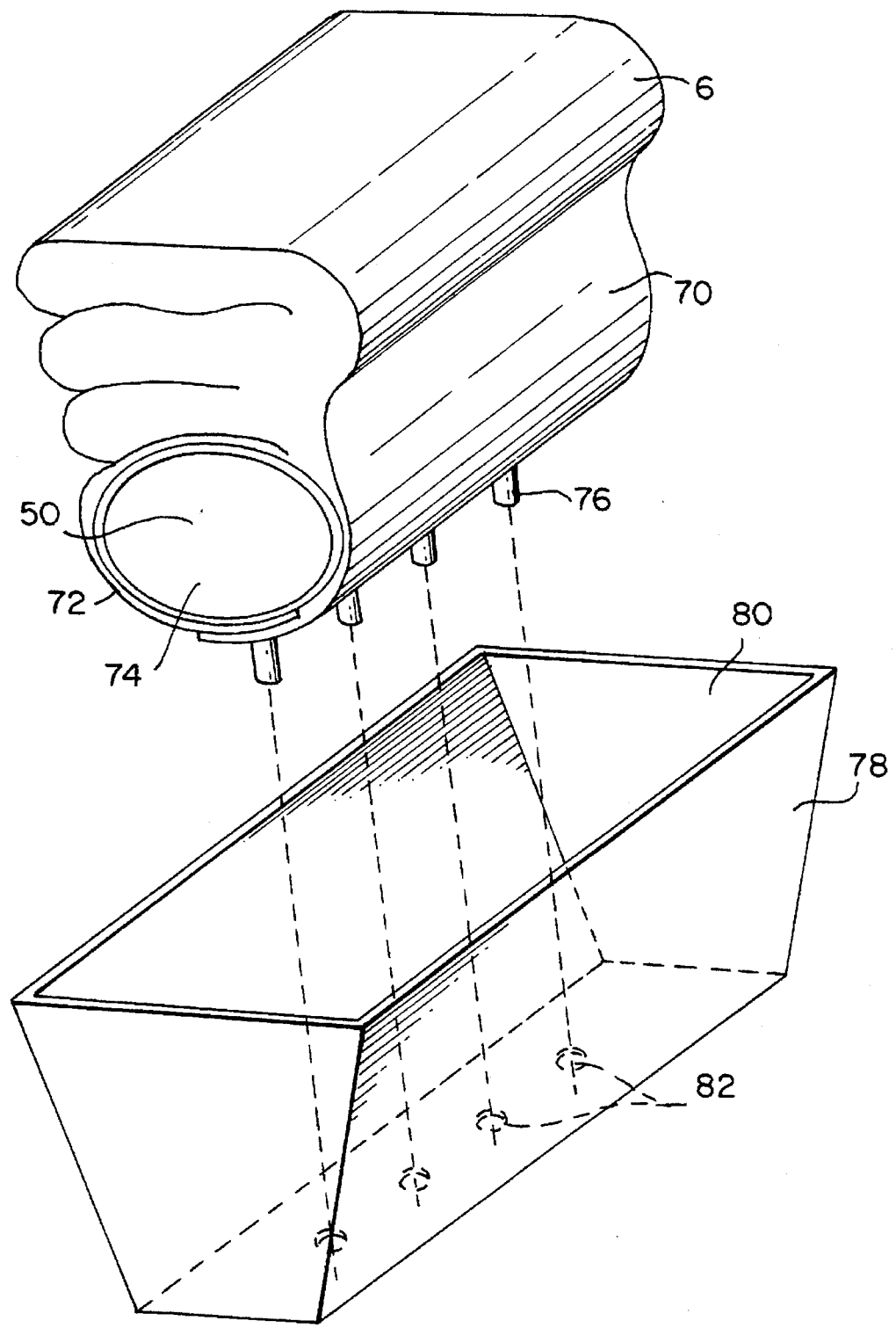
FIG. 7 is an exploded schematic perspective view of an airbag module incorporating a plenum according to the present invention.

A further method of constructing an elliptical plenum is illustrated in FIGS. 5 and 6 wherein an elliptical tube 50 with appropriate gas flow apertures 38 is assembled as a sub-assembly with the inflater 4. The sub-assembly can then be assembled as a unit into a reaction canister, either through the elongated opening, or mouth, typically provided for deployment of the cushion, or through sealable openings provided in the canister's lateral end walls. The elliptical tube 50 provides the side wall of the plenum chamber. The ends 52 and 54 of the tube 50 once it is assembled in the reaction canister are always functionally closed. The functionally closed ends can be provided either by mounting end walls to the ends of the elliptical tube 50, as demonstrated in the following embodiment of FIG. 7, or by providing a complementary closed mating surface on the parts of the reaction canister to which the ends 52 and 54 of the elliptical tube, or side wall, abut. As illustrated in FIG. 6, an end view of the assembly shown in FIG. 5, the diameter of the interior of tubular plenum 50 at its minor axis is just slightly larger than the diameter of the cylindrical inflator 4. As illustrated by the arrows, the inflation gas follows two major paths as it exits the inflator through outlet ports 48. One is directly into the cushion through the closest gas flow aperture 38. The other is parallel to the inflator through the gas flow channel provided between the cylindrical inflator 4 and the elliptical plenum 50. As the latter flow reaches the additional gas flow apertures 38 located along the length of the plenum, portions of the gas turn 90° and pass through the additional apertures and into the interior of the cushion. The size of the apertures and their location control the relative size of the portion of inflation gas which passes each of the respective apertures. As indicated previously with respect to the embodiment illustrated in FIG. 1, the particular aperture sizes and locations will vary depending on the desired characteristics of the particular airbag module. However, since inflation gas is directed to enter the cushion from both ends of the plenum, the tendency of the cushion to deploy in a skewed condition is overcome. Such a sub-assembly provides for the desired redistribution of the inflation gases, while only adding double the wall thickness of the tubular plenum to the front to rear space occupied by the inflator. The sub-assembly, therefore, does not appreciably reduce the space available for storage of the folded airbag.

FIG. 7 illustrates, in exploded schematic form, a preferred construction of a sub-assembly, such as that illustrated in FIGS. 5 and 6, with the other major components of an airbag module. In this embodiment, the folded airbag cushion 6 has flaps 70 and 72 extending from the longitudinal edges of its inflation gas inlet opening. The inflator (not shown) is mounted in the tubular elliptical plenum 50 as illustrated in FIGS. 5 and 6 and the end walls 74 sealingly mounted to the elliptical tube to form a subassembly comprising the inflator, the elliptical plenum and the cushion. The tubular plenum is provided with mounting structure 76, in the specific form of four studs, along it's far side for mounting in the reaction canister, or housing, 78. The folded cushion is mounted on the tubular elliptical plenum 50 with its inflation gas inlet opening positioned directly over the plenum's gas flow apertures. Flaps 70 and 72 extend around the side of the plenum to overlap on the plenum's far side, where they each engage the four studs 76. The sub-assembly with the folded airbag cushion is inserted as a unit through the mouth 80, another term for the elongated opening on the deployment side of the reaction canister, and the four studs inserted in the complementary holes 82 provided in the reaction canister. The studs are then mated with nuts or some other form of fastener (not shown) to secure the sub-assembly within the canister. The resulting airbag module accommodates an end discharge inflator, redistributes the inflation gas to provide a cushion which deploys in a non-skewed manner, in a relatively compact reaction canister with relatively few and relatively easily assembled parts. Such a module can have a relatively short front (mouth) to rear dimension, making it particularly suitable for use in vehicles where the mounting space is limited. Moreover, the reduced number of components needed to accomplish the redistribution of the inflation gases reduces the manufacturing costs, as relates to both parts and labor, of the module.

Figure 8:
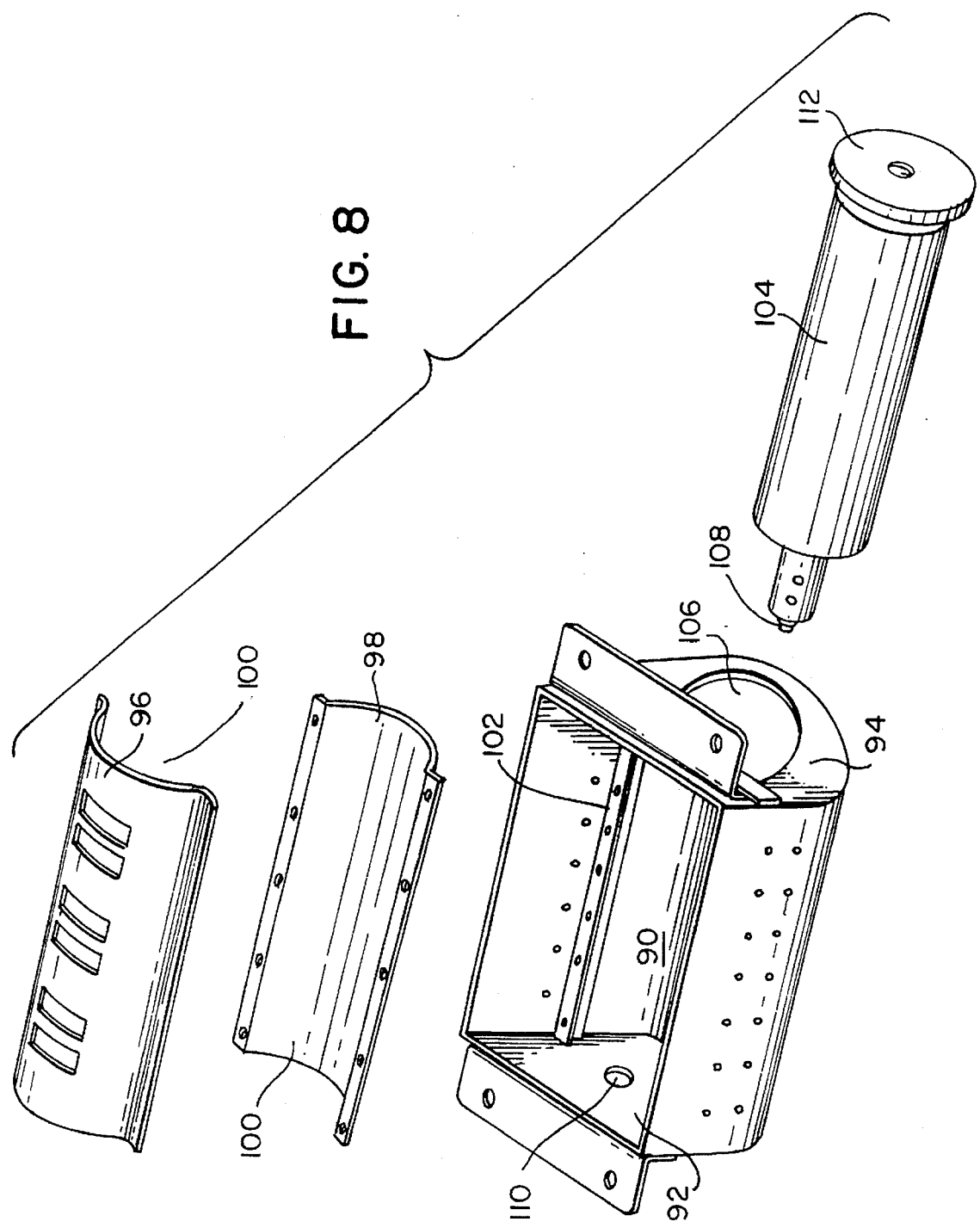
FIG. 8 is an exploded schematic perspective view of a further airbag module incorporating a further plenum according to the present invention.

A further embodiment of the invention, wherein the reaction canister and the plenum are fabricated from sheet metal, is shown in exploded schematic form in FIG. 8. The reaction canister 90 has a first end 92 and a second end 94 formed from a suitable sheet metal, such as sheet aluminum or sheet steel. The plenum side wall is formed from two elongated pieces of sheet metal 96 and 98, which are shaped to form an elliptical opening 100 extending longitudinally between them. The two pieces of sheet metal are placed on mounting shelves 102 provided on opposing longitudinal sides of the reaction canister and attached by suitable attachment means, such as screws, rivets, etc. (not shown), holding the two pieces of sheet metal and the mounting shelf together. The two pieces of sheet metal are provided to fit snugly within the two ends 92 and 94 of the reaction canister so that the ends of the reaction canister also serve as ends of the plenum chamber. To this purpose, the ends of the reaction canister may be provided with complementary mating surfaces for mating with the portions of the ends of the two pieces of sheet metal which define the elliptical opening 100. After the plenum is assembled within the reaction canister, the inflator 104 is inserted through the large port 106 provided in the canister's second end 94. The mounting bolt 108 at the leading end of the inflator is then directed into the small port 110 at the canister's first end 92. A nut (not shown), or other cooperating attachment means, can then be applied to the mounting bolt 108, therein compressing the two ends 92 and 94 toward each other, effectively sealing (a) the large port 106 with the large flange 112 provided at the trailing end of the inflator 104, (b) the small port 110 with a cooperating surface provided on the mounting bolt, and (c) the ends of the two pieces of sheet metal which form the plenum side wall to the portion of the first and second ends 92 and 94 which define the plenum's end walls. This embodiment permits the use of sheet metal to form the plenum chamber while also providing a relatively easily accessible mounting for the inflator.

While the embodiment of FIG. 8 forms the reaction canister from multiple sheet metal pieces, a similar reaction canister which uses fewer pieces of sheet metal and thereby simplifies the assembly process, could be prepared by deep drawing a single metal sheet to provide a canister housing which includes all of the walls, as well as the mounting shelves 102.

It should be appreciated that the present invention takes advantage of the flow distribution channels which occur between a circular form and an elliptical form in which the circular form is placed. While the preferred cross-sectional shape of the invention's plenum is elliptical, it should be apparent that similar shapes which might not be truly elliptical according to the geometric definition of such, can offer essentially the same type of flow distribution channels, i.e. along those sides of an enclosed circular inflator which are normal to the direction of gas flow from the inflator to the interior of the airbag cushion. The terminology "generally elliptical", as used in this application, is intended to be interpreted to be inclusive of such similar shapes.

It should be further understood that the preceding description has been provided to enable workers in the art to make and practice the disclosed invention. Workers in the art are capable of variations and modifications of the described plenums and modules which would continue to embody the inventive concepts described herein. Such variations and modifications are intended to be covered by this patent to the extent they fall within the scope of the following claims.

We claim:

1. In an inflatable restraint airbag module comprising:
   (a) an inflatable airbag cushion having an inflation gas inlet opening;
   (b) an inflator capable of producing sufficient gas to inflate said airbag cushion upon activation and having outlet ports at one end thereof for discharging said gas;
   (c) a reaction canister for housing said airbag cushion and said inflator, said reaction canister forming a chamber for said airbag cushion, said chamber including an elongated opening along one side thereof for deployment of the airbag cushion therethrough;
   the improvement comprising providing a plenum surrounding said inflator, said plenum comprising a side wall having a generally elliptical shape and extending between two essentially closed ends, said side wall having at least one gas flow aperture providing flow communication between said outlet ports and said inlet opening, said at least one gas flow aperture being located in a quadrant of said generally elliptical shape which is traversed by the minor axis of said generally elliptical shape.

2. The airbag module of claim 1, wherein said chamber comprises first and second opposed longitudinal sides and first and second opposed lateral ends joined to form said elongated opening at said one side of the chamber, and wherein at least that portion of said plenum containing said at least one gas flow aperture is located at the side of said chamber opposite said elongated opening.

3. The airbag module of claim 2, wherein said at least one gas flow aperture is located adjacent at least one of said lateral ends.

4. The airbag module of claim 2, wherein said at least one gas flow aperture includes apertures provided at locations adjacent each of said first and second lateral ends.

5. The airbag module of claim 2, wherein the side wall of said plenum is integral with the longitudinal sides of said chamber.

6. The airbag module of claim 5, wherein said longitudinal sides of said chamber and the integral side wall of said plenum are an extrusion.

7. The airbag module of claim 6, wherein said side wall of said plenum engages complimentary portions of each of said lateral ends.

8. The airbag module of claim 1, wherein:

said inflator is formed with a generally circular side wall extending between a first end which includes said outlet ports and a second end; and said at least one gas flow aperture is located in a quadrant of said generally elliptical shape which is bisected by the minor axis of said generally elliptical shape of said side wall.

9. The airbag module of claim 8, wherein said inflator is centered in said plenum.

10. The airbag module of claim 8, wherein said inflator is located along the side of the plenum which is opposite to that quadrant of the side wall which contains said gas flow aperture.

11. The airbag module of claim 1, wherein said side wall of said plenum is formed from a generally elliptical tube.

12. The airbag module of claim 11, wherein a closable opening is provided in said canister, and said inflator extends through said closable opening.

13. The airbag module of claim 11, wherein said side wall of said plenum is mounted in said canister through said elongated opening.

14. The airbag module of claim 13, wherein said ends of said plenum are formed from surfaces on the interior of said reaction canister which sealingly abut the ends of said generally elliptical tube.

15. The airbag module of claim 13, wherein said ends of said plenum are sealingly mounted to said elliptical tube to substantially seal the ends thereof.

16. The airbag module of claim 13, wherein said airbag cushion has flaps extending past said gas inlet opening and around the exterior of said plenum.

17. The airbag module of claim 1, wherein said side wall of said plenum is formed from at least two pieces of elongated sheet metal joined at their longitudinal edges and shaped so as to define a generally elliptical opening between, and extending the length of the at least two pieces.

18. A reaction canister for use as a housing for an inflatable restraint airbag system, comprising:

(a) end walls;

(b) longitudinal side walls extending between said end walls and defining therewith an elongated opening which is capable of allowing an airbag cushion to be deployed therethrough;

(c) a plenum comprising a side wall having a generally elliptical cross section and having a gas flow aperture in its top surface, said top surface being defined by a sealing engagement of said plenum side wall with said longitudinal side walls and said end walls, and wherein said sealing engagement of said plenum side wall with said longitudinal side walls being located at locations which substantially span the major axis of said generally elliptical cross section of said side wall of said plenum.

19. The reaction canister of claim 18, wherein said sealing engagement of said plenum side wall with said longitudinal side walls and said end walls is located a sufficient distance from said elongated opening to permit a folded air bag to be fully located within the space defined by said top surface, said longitudinal side walls, said end walls and said elongated opening.

20. The reaction canister of claim 18, wherein said gas flow aperture is provided in said top surface of the plenum adjacent one of said end walls.

21. The reaction canister of claim 18, wherein at least one said gas flow aperture is provided in said top surface of the plenum adjacent each of said end walls.

22. The reaction canister of claim 18, wherein said side wall of said plenum and said longitudinal side walls are integrally formed.

23. An assembly for use in an inflatable restraint airbag system, comprising:

(a) an elongated inflator having at least one gas outlet port at one end thereof; and (b) an elongated plenum comprising a side wall which extends around said inflator and which has a generally elliptical cross-section extending the length of said inflator, said plenum side wall having at least one gas flow aperture at a location contiguous with the minor axis of its elliptical cross-section.

24. The assembly of claim 23, wherein said plenum further comprises mounting structure for mounting said assembly in a housing for an inflatable restraint airbag system.

25. The assembly of claim 24 further comprising:

an inflatable cushion having an inflation gas opening with flaps extending therefrom, said flaps extending around the exterior of said plenum.

26. The assembly of claim 23, wherein said elongated plenum further comprises end walls at each end of said side wall and cooperating with said side wall to enclose said elongated inflator.

* * * * *